United States Patent [11] 3,625,351

| [72] | Inventor | Melvin I. Eisenberg<br>2908 West Lunt, Chicago, Ill. 60645 |
|---|---|---|
| [21] | Appl. No. | 818,272 |
| [22] | Filed | Apr. 22, 1969 |
| [45] | Patented | Dec. 7, 1971 |

[54] A STERILIZED TEARABLE BAG
9 Claims, 9 Drawing Figs.

[52] U.S. Cl. .................................................. 206/56 AA,
206/63.2, 229/66
[51] Int. Cl. .................................................. B65d 27/32,
B65d 83/00, A61b 19/02
[50] Field of Search .......................................... 206/56 AA,
56 AB, 63.2; 229/66

[56] References Cited
UNITED STATES PATENTS

| 2,358,246 | 9/1944 | Nicolle | 206/56 AB |
| 2,549,069 | 4/1951 | Donofrio | 206/56 AA |
| 2,851,212 | 9/1958 | Parmer | 229/66 |
| 3,001,644 | 9/1961 | Fourness et al. | 206/56 AA |
| 3,186,628 | 6/1965 | Rohde | 229/66 |
| 3,315,802 | 4/1967 | Lonholdt et al. | 206/63.2 |

*Primary Examiner*—William T. Dixson, Jr.
*Attorney*—Wallenstein, Spangenberg, Hattis & Strampel ABSTRACT: A sterilized tearable bag is preferably made by forming sheets of polyvinyl chloride material most advantageously striated throughout. Before or after cutting the sheets to size, they are placed into confronting relation with the striations extending in the same direction and sealed around the product to be sterilized. The bag walls can be brought into face-to-face contact beyond the product so the bag can be subsequently torn along a pair of aligned striation-forming indentations.

INVENTOR
MELVIN I. EISENBERG

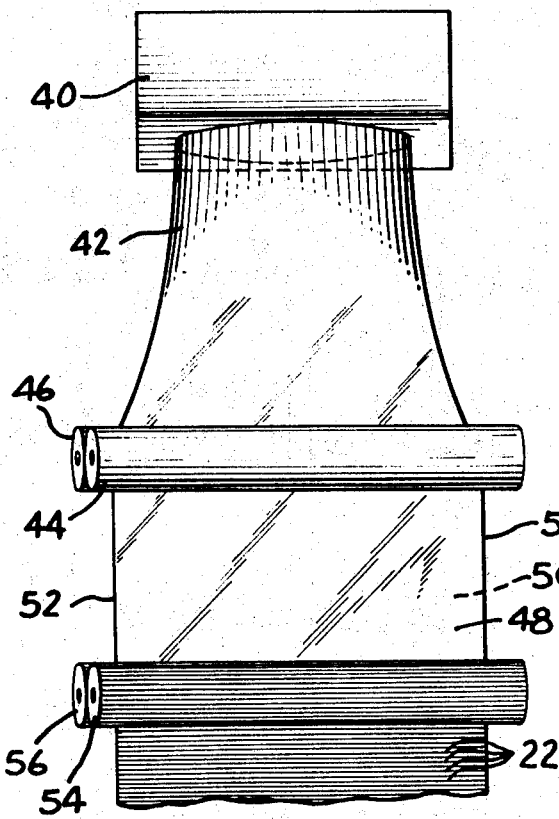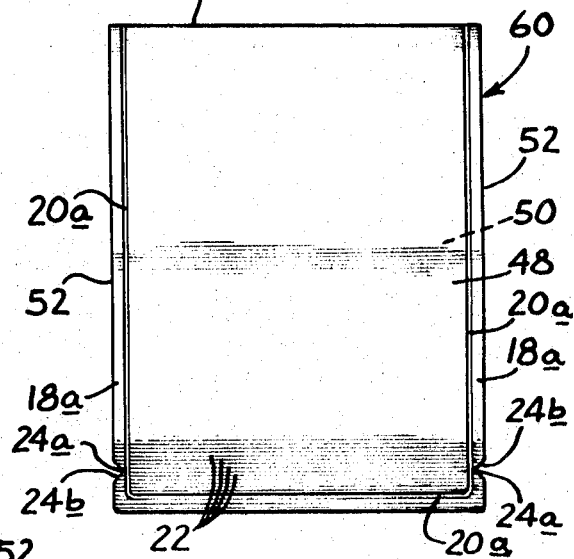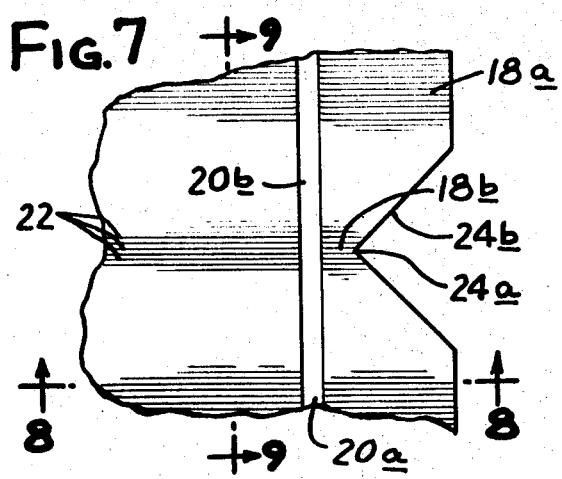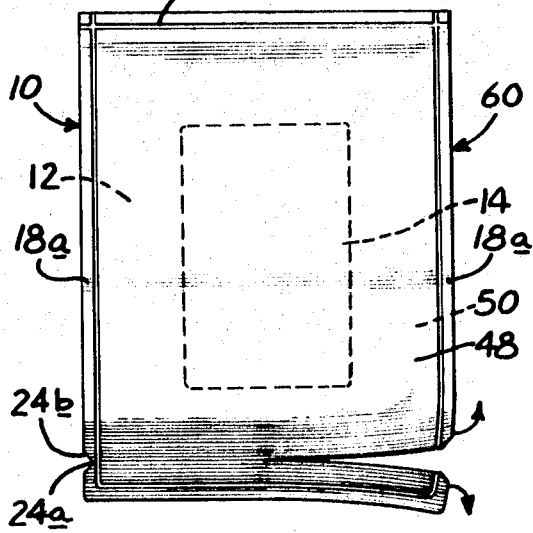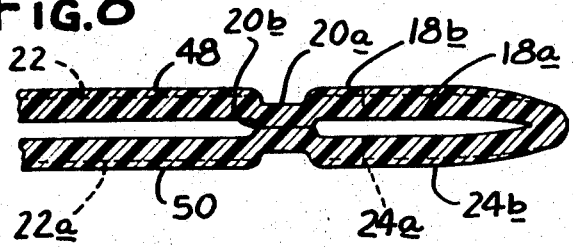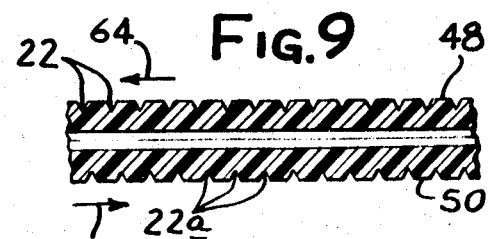

A STERILIZED TEARABLE BAG

This invention relates primarily to packaging of products in plastic bags.

Heretofore, products have been sealed in plastic bags for maintaining the product in a highly purified condition, and in some cases the bags are required to be semipermeable to sterilizing gas so that the product can be sterilized after packaging. In the field of packaging and sterilizing products for medical use much effort has been expended to develop a bag having the appropriate strength, severability, and permeability to sterilizing gas, and which is made of relatively inexpensive synthetic plastic sheet material as these bags are generally of the disposable type. The plastic material previously considered to be far superior to all other materials for making such bags is polyethylene, which is impervious to bacteria but pervious to gases when an unequal pressure is present on the opposite sides thereof. The bag, with the product to be sterilized sealed therein, is placed in a processing chamber which is evacuated so air from within the bag is drawn through the gas-permeable walls of the bag due to the difference in gas pressure on either side of the walls, thus forming a reduced pressure within the bag. Thereafter, the chamber is pressurized with ethylene oxide, a very effective sterilizing gas, which then passes into the sealed bag. The chamber is then evacuated to remove the ethylene oxide and is then filled with air at atmospheric pressure.

The time required to sterilize products within the plastic bag in accordance with the above-mentioned process depends upon the sterilizing gas mixture used, the wall thickness of the bag, and the amount of vacuum and pressure formed within the processing chamber receiving such bags. Materials such as polyvinyl chloride were never seriously considered for sealed sterilizable bags because it is a much weaker material than polyethylene and its gas permeability to common gases listed in published permeability tables (which do not include sterilizing gases like ethylene oxide) is substantially inferior thereto. From the standpoint of gas permeability and suitability in the making of sealed bags in thin sheets such as 0.002 inches thick, polyethylene has been considered far superior to all other materials. (Polyvinyl chloride sheets cannot be readily made with such thinness without pinholes.) Where polyethylene bags are to be made readily tearable, they have been provided with a scribe or score line to facilitate the tearing of the bag. Such scribe lines have weakened the bags to a point where they sometimes tear under the forces present during the sterilizing process described above. The use of the thicker material to over come this problem is undesirable since it increases the expense of the material, the time for the gas to penetrate the thicker material and the difficulty in tearing open the bag.

Accordingly, one of the objects of this invention is to provide sealed plastic bags for receiving articles therein which are easily opened by tearing.

In accordance with this invention a plastic sealed bag preferably (but not necessarily) made of confronting sheets of polyvinyl chloride material, is made easy to tear preferably by striating the polyvinyl chloride sheets making up the bag throughout. One method of forming the striations is the use of calender rolls associated with an extrusion process apparatus used to make the sheet material, the calender rolls being embossed for this purpose. The indentations forming the striations are closely spaced for reasons to be explained. The extruded sheets of polyvinyl chloride are cut to size, sealed around the product to be sterilized and also preferably provided with a V-shaped notch to make it easy to initiate a tearing operation. The product in the bag preferably fits loosely within the bag so the bag walls can be brought into face-to-face contact along the entire width of the bag where the bag is to be torn. Also, the striations should be so closely spaced that a slight shifting of the bag walls will always bring the indentations on the opposite bag walls into alignment if they are not initially so aligned. In such case, the application of a tearing force will automatically shift the bag walls into a position where the indentations are aligned for easy tearing of the same.

It will be seen that several features of this invention may be used to great advantage in making tearable bags for uses other than packaging of sterilized products. That is, the striations formed in accordance with this invention may be formed on plastic bags made of materials other than polyvinyl chloride and a notch may also be formed as taught by this invention to facilitate tearing open the bag.

Other features, objects and advantages of this invention will be more fully realized and understood from the following detailed description when taken in conjunction with the accompanying drawings wherein like reference numerals throughout the various views of the drawings are intended to designate similar elements or components.

FIG. 4 illustrates one method of making plastic bags in accordance with this invention;

FIG. 5 is a plan view of a plastic bag made from continuous flat sheets of the apparatus of FIG. 4;

FIG. 6 is another showing of the plastic bag of FIG. 5 but illustrating tearing open the bag along striations in registry with notches along the margin of the bag;

FIG. 7 is an enlarged fragmentary view illustrating the notch in the margin of the bag and striations in the region of the notch;

FIG. 8 is a sectional view taken along lines 8—8 of FIG. 7; and

FIG. 9 is a sectional view taken along line 9—9 of FIG. 7 illustrating the indentations formed by the striations on the outer surface of the plastic material forming the bag.

Figure 1:
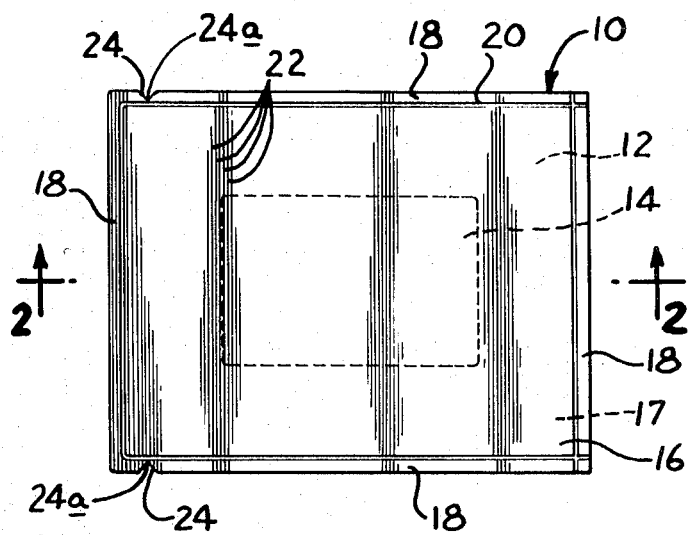
FIG. 1 is a plan view of a plastic bag of this invention containing a product therein for sterilization.
Figure 2:
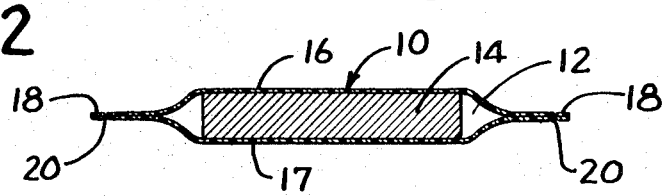
FIG. 2 is a diagrammatic sectional view of a processing chamber for sterilizing plastic bags made in accordance with this invention as taken along line 2—2 of FIG. 1.

Referring now to FIGS. 1 and 2, the plastic bag of this invention is indicated by reference numeral 10 and is here shown in a sealed condition completely about the peripheral edge region of the bag 10, the result being a hermetically sealed compartment 12 for confining a product 14. The bag 10 is formed of confronting flexible walls 16 and 17 of polyvinyl chloride sheet material preferably in a composition containing suitable plasticizers in a range of 10 to 25percent and most preferably 18 percent, the thickness of each wall 16 and 17 preferably being between 3 and 5 mills (most preferably 3½ mills). (The use of a much higher percentage of plasticizers than 25 percent reduces gas permeability to an undesired degree and of a much lower percentage of plasticizer than 10 percent makes the bags too brittle.)

The bag 10 is provided with a margin 18 extending outwardly of a seal 20 along the four sides of the bag where the two walls 16 and 17 are sealed together. To facilitate tearing open the bag, striations 22 comprising a multitude of closely spaced grooves or indentations are formed in the walls 16 and 17 in at least one region of the bag, the striations on one wall being substantially parallel with the striations of the other wall and being so closely spaced (e.g.) that a slight shifting of the bag walls will bring the grooves or indentations in alignment if they were not initially so aligned. Another aspect of this invention is the provision of one or more slits or preferably V-shpaed notches 24 in the margins 18 where the bag is to be severed, the slits or notches terminating outside of the sealed portion of the bag. When a V-shaped notch is used the apex thereof points in the direction of the striation such that nominal manual tearing forces applied at one of the notches 24 will result in easy opening of the bag. Preferably, the product is sealed within the bag, or the bag sealed about the product, whichever the case may be, in an air atmosphere having a relative humidity of, for example 33 percent, so that moisture will be sealed in the bag with the product. The moisture within the bag is believed to act as a catalysis for the sterilizing gas thus reducing the time required for such sterilization.

Figure 3:
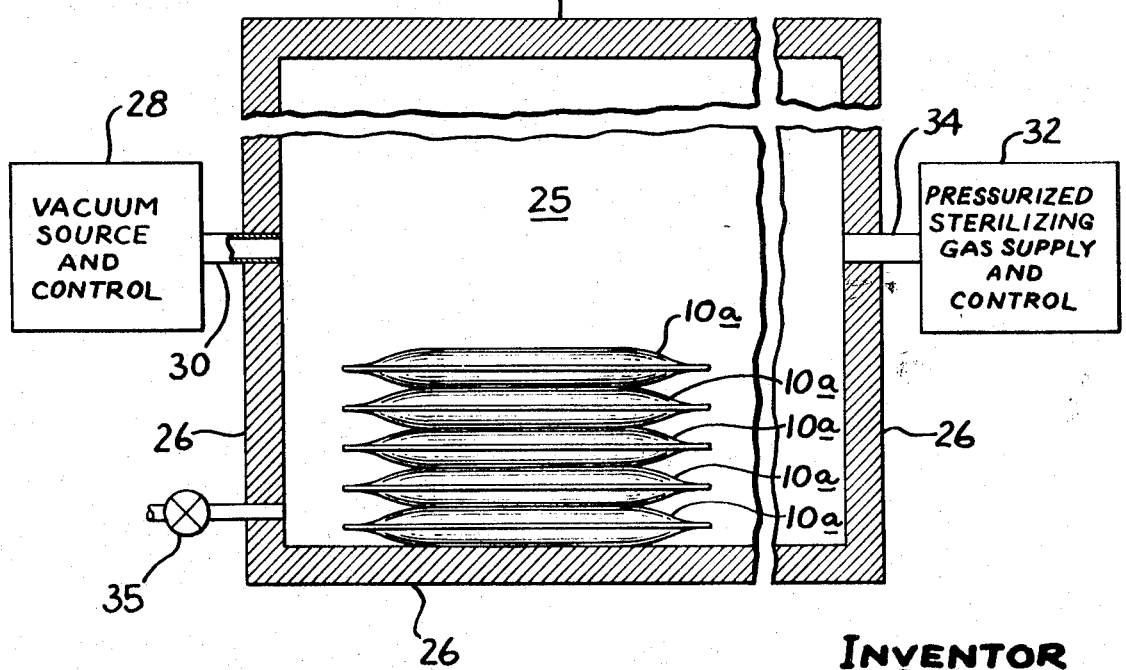
FIG. 3 is a diagrammatic sectional view of a processing chamber for sterilizing plastic bags made in accordance with this invention.

After the bag 10 is sealed about the product 14, either by placing the product within an opening formed along one edge of the bag or by simultaneously sealing together the two walls 16 and 17 with the product therebetween, the product 14 is sterilized by the passage of ethylene oxide gas through the walls 16 and 17. This is most advantageously accomplished by using a processing chamber 25 as seen in FIG. 3. The processing chamber 25 is defined by surrounding walls 26 with suitable access means, not shown, to facilitate filling and emptying the chamber. Here, the filled sealed plastic bags are indicated by reference numeral 10a and the bags 10a may be placed in the processing chamber 25 in a loose condition, as shown, or may be placed in cartons, if desired. Also, the processing chamber 25 may take any desired form as for example a large sealed room capable of receiving a large number of bags 10a at one time. The processing chamber 25, in a sealed tight condition and with bags 10a therein, is evacuated of its atmosphere by a suitable vacuum source and control 28 which is in fluid communication with the chamber 25 through a conduit 30 to create a negative pressure, for example, 27 inches of mercury. Since the bags 10a were sealed under atmospheric conditions, the pressure within the chamber 12 of the bag 10, FIGS. 1 and 2, is atmospheric pressure. Therefore, the evacuation of the processing chamber 25 will cause a pressure differential between the inside and outside of each bag 10a which results in the passage of air from within the bag through the semipermeable walls 16 and 17, thus causing a corresponding negative pressure within each of the sealed bags 10a. The negative pressure within the chamber 25 is maintained for a sufficiently long period of time to allow the pressure within each bag 10a to approximately equal the negative pressure of the processing chamber 25. However, the molecules of moisture that were sealed in the bag during the packaging of the product will remain in the bag during this evacuation process because large-size moisture molecules do not readily penetrate the bag walls whereas air and sterilizing gas do under certain conditions.

After the interior of each of the bags 10a is sufficiently evacuated, the processing chamber 25 is pressurized with a sterilizing gas mixture containing ethylene oxide by means of a pressurized sterilizing gas supply and control 32 which is in fluid communication with the processing chamber 25 through a conduit 34, the pressure, for example, being approximately 10 pounds gage pressure and being maintained for approximately 1 to 2 hours when bags of polyvinyl chloride materials are used (as compared to 5 or 6 hours when bags of polyethylene materials are used). After the process of sterilizing the bag is completed, the processing chamber 25 is evacuated and subjected to air at atmospheric pressure by means of a control valve 35 which may be controlled by any suitable means. Bacteria in the air cannot enter the semipermeable membranes formed by the bag walls, although the air molecules readily pass through the walls while a pressure differential thereacross exists.

Referring now to FIG. 4 there is seen one kind of apparatus that can be used to manufacture polyvinyl chloride bags in accordance with this invention. An extruding mechanism is indicated diagrammatically at reference numeral 40 and is used to form a continuous cylindrical tube 42 of thin flexible film of polyvinyl chloride. This cylindrical tube 42 is flattened by press rolls 44 and 46 thus forming two confronting sheets 48 and 50 joined together at the folded-over portions 52 longitudinally of the sheets. The flattened sheets 48 and 50 then pass between a pair of embossed calendering rolls 54 and 56 which form striations comprising finely spaced grooves or indentation transversely of the flattened sheets, these striations being indicated generally by reference numeral 22 thus corresponding to the striations of FIG. 1. The cylindrical tube 42 may be of any desired dimension to form bags of any desired width and sections of the continuous flattened sheets 48 and 50 may be cut to any desired length. The striations formed by the apparatus of FIG. 4 are continuous along the length of the sheets passing between the rolls 54 and 56 so bags of any size can be cut therefrom with striations located at points of the bag to be torn. However, in accordance with a broad aspect of the invention involving the use of striations in the bag only selected areas of the sheets may be striated and either before or after they are cut to desired lengths.

FIG. 5 illustrates a section 60 of the flattened sheets 48 and 50 which is further process in accordance with this invention. Here a seal 20a is formed along three edge regions of the section 60 inwardly of the exact edges thereof to form a margin 18a of plastic material outwardly of the chamber of the bag thus formed. An opening 62 remains along one edge of the bag to receive a product therethrough presently or at some later time. One or more notches 24b are formed in the margins 18a that extend perpendicularly of the striations 22 and, as mentioned hereinabove, the apex 24a of the notches 24 and 24b point in the direction of the striations, as seen in FIG. 1, with one or more grooves or indentations of the striations on each sheet 48 and 50 being in substantial alignment at the apex 24a of the notches, this result being substantially automatic due to the fine spacing between grooves of the striations. Therefore, notches may be formed anywhere along the appropriate margin to obtain this result and the notches may be formed simultaneously when forming the seal 20a or at a later time, care being taken not to allow the notch to extend over the inner portion 20b of the seal 20a, and preferably leaving a margin portion 18b between the seal 20a and the notch 24b as best seen in FIGS. 7 and 8. As seen in FIG. 9 the grooves of the striations 22 of each sheet 48 and 50 are shown out of alignment as above indicated, here the upper indentations being indicated at 22 and the lower indentations being indicated at 22a, but because a small amount of shifting of the bag walls, as indicated by the arrowed lines 64 and 65, at least a pair of opposed indentations 22 and 22a are brought into alignment which occurs automatically when a manual tearing force is applied to the bag.

After the bag 10 is formed in accordance with this invention, the product 14 may be placed in the bag and the bag sealed at 66 near the edge thereof having the opening 62 and is thereafter sterilized as described hereinabove. When the product is to be used the bag is quickly and easily torn open by a manual tearing force applied at one of the notches 24 or 24b as illustrated in FIG. 6.

Accordingly, this invention provides tearable sealed bags which are most advantageously made of semipermeable polyvinyl chloride material which was unexpectingly found to be many times more permeable than plastic materials usually used for this purpose. Variations and modifications may be effected of the process and bag construction disclosed above without departing from the spirit and scope of the broad aspects of this invention.

I claim:

1. A sealed bag comprising: at least one pair of confronting walls of flexible sheetlike material sealed at the periphery thereof around a product, the walls being positionable in face-to-face confronting relation between spaced sealed peripheral portions thereof at a section of the bag outwardly of the product and being relatively movable at least in a direction transverse to the direction between said spaced sealed peripheral portions, each of the confronting walls having a number of parallel closely spaced striation extending between said spaced sealed peripheral portions at least in said section of the bag where the walls can be brought together, said striations in said confronting walls being opposite one another and being misaligned, but being so very closely spaced that even when the striations are in their maximum possible degree of misalignment they are automatically positioned substantially in alignment by the shifting of one wall with respect to the other wall in said transverse direction under a manual shearing force applied to the bag by grasping one of said sealed peripheral portions of the bag at said section thereof and tearing the same in the direction of and along said striations.

2. The bag according to claim 1 further including a severed tear-guide portion outwardly of the inner margin of one of said sealed peripheral portions of the bag opposite said striated section of the bag, to form a tear guide in the sealed portion thereof to facilitate the initial tearing of the sealed portion of the bag to a point contiguous to the inner margin of said one sealed peripheral portion.

3. The bag according to claim 2 wherein said severed tear guide portion is a V-shaped notch.

4. A bag according to claim 1 wherein the product is sterile, and said sheetlike material forming said adjacent walls acts as a semipermeable membrane normally impervious to the passage of air therethrough and pervious to sterilizing gases when a pressure differential is applied thereacross.

5. A bag according to claim 1 wherein said confronting walls are made of polyvinyl chloride.

6. The bag of claim 1 wherein the striations in the bag walls extend throughout said walls thereof.

7. A bag comprising: at least one pair of confronting walls of flexible sheetlike material sealed together about all but one marginal open portion thereof to provide an ingress opening for a product to be packaged, the walls being positionable in face-to-face confronting relation between spaced sealed peripheral portions thereof on opposite sides of the bag and being relatively movable at least in a direction transverse to the direction between said spaced sealed peripheral portions, each of said walls having a number of closely spaced parallel striations extending completely across the width of said walls between said spaced sealed peripheral portions thereof, said striations in said confronting walls being opposite one another and being misaligned, but being so very closely spaced that even when the striations are in their maximum possible degree of misalignment they are automatically positioned substantially in alignment by the shifting of one wall with respect to the other wall in said transverse direction under a manual shearing force applied to the bag by grasping one of said sealed peripheral portions of the bag at said striations thereof and tearing the same in the direction of and along said striations.

8. The bag according to claim 7 further including a severed tear-guide portion outwardly of the inner margin of one of said sealed peripheral portions of the bag opposite said striated section of the bag, to form a tear guide in the sealed portion thereof to facilitate the initial tearing of the sealed portion of the bag to a point contiguous to the inner margin of said one sealed peripheral portion.

9. The bag of claim 8 wherein said severed tear-guide portion is a V-shaped notch.

* * * * *